No. 660,853. Patented Oct. 30, 1900.
K. M. JENNINGS.
FLOWER STAND.
(Application filed Mar. 19, 1900.)
(No Model.)
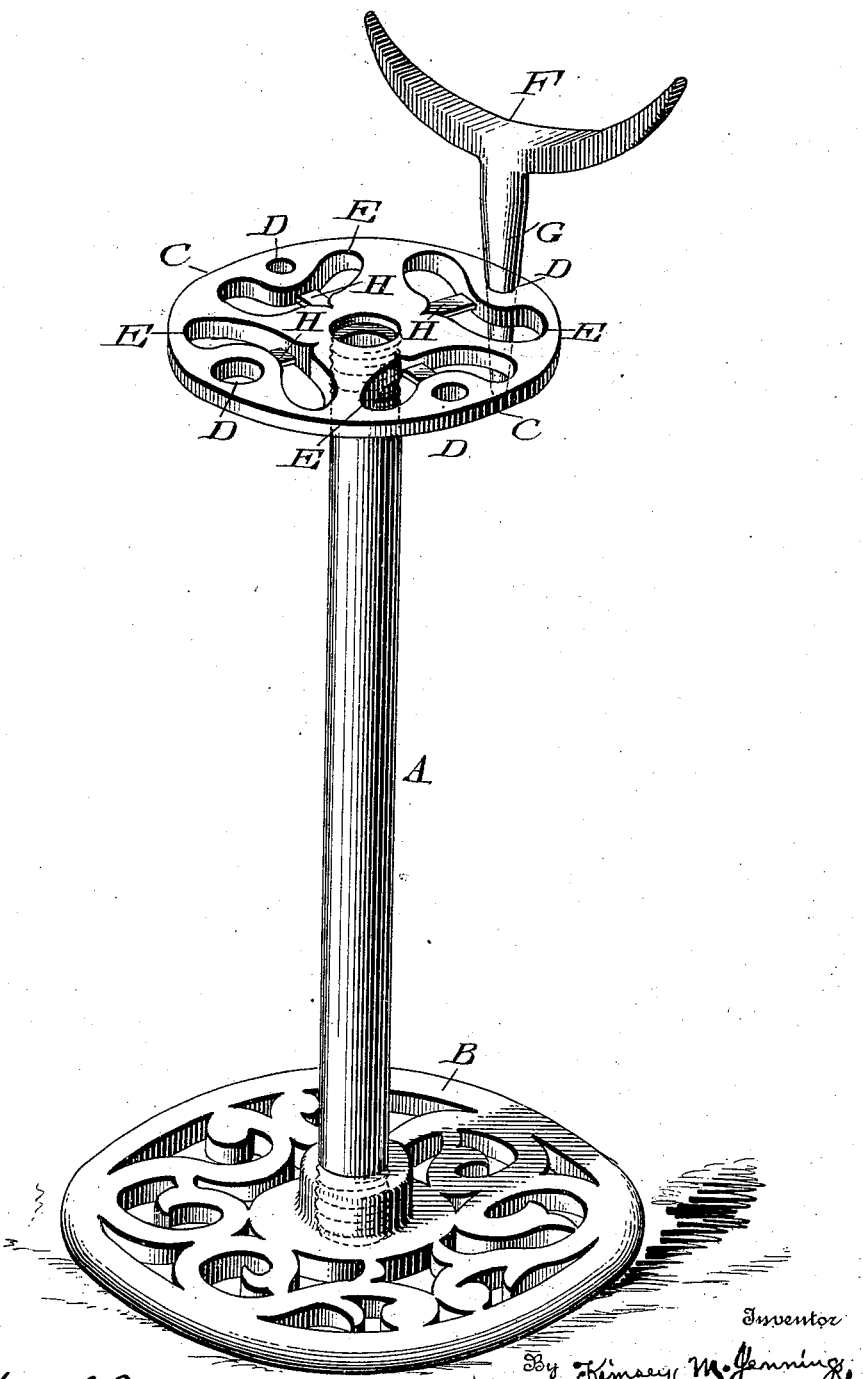

UNITED STATES PATENT OFFICE.

KIMSEY M. JENNINGS, OF PHILADELPHIA, PENNSYLVANIA.

FLOWER-STAND.

SPECIFICATION forming part of Letters Patent No. 660,853, dated October 30, 1900.

Application filed March 19, 1900. Serial No. 9,226. (No model.)

*To all whom it may concern:*

Be it known that I, KIMSEY M. JENNINGS, a citizen of the United States, residing in the city and county of Philadelphia, State of Pennsylvania, have invented a new and useful Improvement in Flower-Stands, which improvement is fully set forth in the following specification and accompanying drawing.

My invention consists of a stand for displaying flower-pots or potted plants in which the head thereof is provided with means for adjusting the angle of the pots, flowers, or plants, the construction of parts being hereinafter described and the novel features pointed out in the claims that follow the specification.

The figure represents a perspective view of a flower-stand embodying my invention.

In the drawing, A designates a standard or column, and B the base thereof. C designates a head which is secured to the top of said standard and provided with the vertical openings D and slots E, it being noticed that the openings D are in front of said slots and made of different diameters.

F designates a concave or segmental-shaped arm, from which depends the tapering stem G, the latter being adapted to enter either of said openings D of the head C.

It will now be seen that when the stem G is inserted in an opening D a flower-pot may be rested on its side on the arm F, and its lower edge may enter the opposite slot E, so that the wall of the latter will prevent slipping of the pot, and thus the latter will be supported in inclined position, so as to angularly display the flowers or plant in the pot. It is evident that the angle of the pot may be varied by the depth of descent of the stem G in the head, thus being varied owing to the different diameters of the openings D, whereby said stem may be held higher or lower, the effect of which is evident.

The walls of the slots E are connected by the cross-bars H, which strengthen the head at the places occupied by said slots and also permit the bottom edge of the flower-pot to rest thereon.

Of course flowers and plants could be angularly supported on the arm F and their stems be inserted in the slots E. The arm F rises from the head near the periphery or margin thereof, so that the main portion of the upper face of said head is left free for the location of the base of the pot or the stems of flowers or plants thereon, according to the desired angular positions of the latter. The arm F may be removed from the head and the latter and the base unscrewed from the standard A and the several parts packed in compact form for transportation, carrying, storage, &c.

Having thus described my invention, what I claim as new, and desire to secure by Letters Patent, is—

1. A flower-stand having a head which is provided with openings of different diameters, and a supporting device having a tapered stem adapted to be fitted in either of said openings, whereby the altitude of said device may be varied, and the article supported thereon may be angularly adjusted.

2. A flower-stand having a head with two openings therein, one of which is elongated, and a movable arm having a depending stem adapted to enter the other opening.

KIMSEY M. JENNINGS.

Witnesses:
E. HAYWARD FAIRBANKS,
F. L. JENNINGS.